T. P. Marshall,

Saw.

No. 112,943.  Patented Mar. 21, 1871.

WITNESSES
Wm A. Steel
Jno B. Harding

T. P. Marshall
by his atty
H. Howson

United States Patent Office.

THOMAS P. MARSHALL, OF TRENTON, NEW JERSEY.

Letters Patent No. 112,943, dated March 21, 1871.

IMPROVEMENT IN SAWS WITH DETACHABLE TEETH.

The Schedule referred to in these Letters Patent and making part of the same.

I, THOMAS P. MARSHALL, of Trenton, Mercer county, State of New Jersey, have invented certain Improvements in Saws with Detachable Teeth, of which the following is a specification.

Nature and Object of the Invention.

My invention consists of a spring-catch, constructed and adapted to a recess in the blade of a saw, and to a notched recess in a detachable tooth, substantially as described hereafter, so that, on driving the tooth to its place in the blade, it shall be self-locking to the latter.

Description of the Accompanying Drawing.

Figure 1:
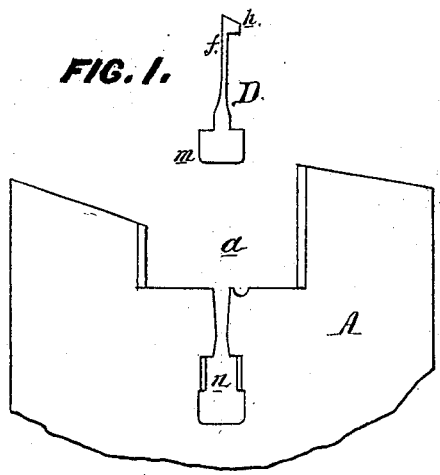
Figure 2:
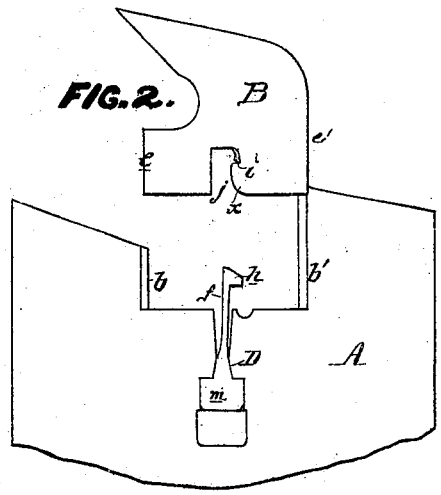
Figure 3:
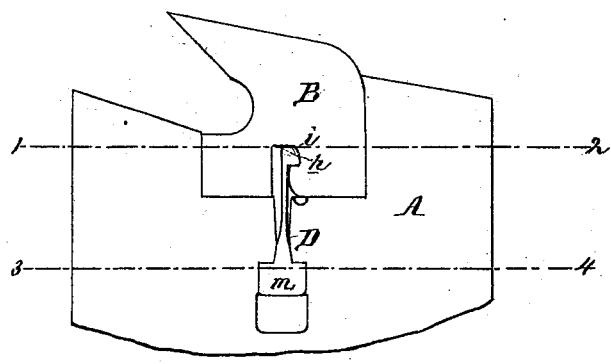
Figure 4:

Figure 1 is a side view of part of a circular-saw blade, showing the recess for the detachable tooth and the spring-catch for retaining the same;

Figure 2, part of the saw-blade, with the spring-catch in its place, and the tooth detached;

Figure 3, a view, representing the tooth and catch fitted to their places in the blade;

Figure 4, a section on the line 1 2, fig. 3; and

Figure 5:

Figure 5, a section on the line 3 4, fig. 3.

General Description.

A represents part of the blade;

B, the detachable tooth; and

D, the spring retaining-catch.

Recesses, $a$, are formed in the blade to receive the desired number of teeth, each recess having on its opposite edges $b$ and $b'$ V-shaped ribs, to correspond with similarly-shaped grooves in the edges $e$ and $e'$ of the tooth.

The catch D consists of a spring, $f$, having at its outer end a projection, $h$, adapted to a shoulder, $i$, formed in one end of the recess $j$ of the tooth, the opposite end of the catch having an enlargement or head, $m$, which is adapted to a recess, $n$, of the blade.

After the catch has been thus introduced it is driven up into the narrower portion of the recess $n$, the opposite sides of which have V-shaped ribs, corresponding with similarly-shaped grooves in the opposite edges of the head $m$.

After the catch has thus been driven tight into its place, as shown in fig. 2, the base of the tooth comes in contact with the projection $h$ of the catch and forces the latter back.

When the tooth, however, has been driven back to its place, the recoil of the spring $f$ causes the projection $h$ to enter the notch above the shoulder $i$ in the recess $j$, and the tooth is consequently securely locked to its place.

It will be unnecessary to describe the mode of removing the tooth.

Claim.

The spring-catch, secured to but detachable from a recessed saw-blade, and having an elastic stem, $f$, inclined head, and a shoulder, $h$, in combination with a tooth, B, adapted to the recess in the saw-blade, and having a recess, $j$, and shoulder, $i$, as specified.

In testimony whereof I have signed my name to this specification in the presence of two subscribing witnesses.

THOMAS P. MARSHALL.

Witnesses:
E. H. BAILEY,
WM. A. STEEL.